US010041160B2

(12) United States Patent
Honjo et al.

(10) Patent No.: US 10,041,160 B2
(45) Date of Patent: Aug. 7, 2018

(54) STEEL FOR SPRING, AND METHOD FOR PRODUCING SPRING

(71) Applicants: JFE STEEL CORPORATION, Tokyo (JP); SUMIHATSU CO., LTD., Tokyo (JP); NHK SPRING CO., LTD., Yokohama-shi, Kanagawa (JP)

(72) Inventors: Minoru Honjo, Tokyo (JP); Kiyoshi Uwai, Tokyo (JP); Shigeru Endo, Tokyo (JP); Katsutoshi Yamashita, Tokyo (JP); Koei Tsuru, Yuki (JP); Keiichi Fujie, Sakuragawa (JP); Akira Tange, Yokohama (JP)

(73) Assignees: JFE STEEL CORPORATION, Tokyo (JP); SUMIHATSU CO., LTD., Tokyo (JP); NHK SPRING CO., LTD., Yokohama-shi (JP)

( * ) Notice: Subject to any disclaimer, the term of this patent is extended or adjusted under 35 U.S.C. 154(b) by 334 days.

(21) Appl. No.: 15/021,048

(22) PCT Filed: Sep. 11, 2014

(86) PCT No.: PCT/JP2014/004722
§ 371 (c)(1),
(2) Date: Mar. 10, 2016

(87) PCT Pub. No.: WO2015/037246
PCT Pub. Date: Mar. 19, 2015

(65) Prior Publication Data
US 2016/0222497 A1   Aug. 4, 2016

(30) Foreign Application Priority Data

Sep. 11, 2013 (JP) ................. 2013-188516

(51) Int. Cl.
| C22C 38/02 | (2006.01) |
|---|---|
| C22C 38/04 | (2006.01) |
| C22C 38/18 | (2006.01) |
| C21D 8/06 | (2006.01) |
| C21D 9/02 | (2006.01) |
| F16F 1/02 | (2006.01) |
| C22C 38/60 | (2006.01) |
| C22C 38/00 | (2006.01) |
| C21D 1/25 | (2006.01) |
| C21D 1/18 | (2006.01) |
| C21D 6/00 | (2006.01) |
| C21D 9/52 | (2006.01) |
| C22C 38/06 | (2006.01) |
| C22C 38/20 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/42 | (2006.01) |

(52) U.S. Cl.
CPC ............... *C22C 38/60* (2013.01); *C21D 1/18* (2013.01); *C21D 1/25* (2013.01); *C21D 6/002* (2013.01); *C21D 6/005* (2013.01); *C21D 6/008* (2013.01); *C21D 8/06* (2013.01); *C21D 8/065* (2013.01); *C21D 9/02* (2013.01); *C21D 9/525* (2013.01); *C22C 38/00* (2013.01); *C22C 38/002* (2013.01); *C22C 38/008* (2013.01); *C22C 38/02* (2013.01); *C22C 38/04* (2013.01); *C22C 38/06* (2013.01); *C22C 38/18* (2013.01); *C22C 38/20* (2013.01); *C22C 38/22* (2013.01); *C22C 38/24* (2013.01); *C22C 38/26* (2013.01); *C22C 38/28* (2013.01); *C22C 38/32* (2013.01); *C22C 38/42* (2013.01); *F16F 1/02* (2013.01)

(58) Field of Classification Search
None
See application file for complete search history.

(56) References Cited

U.S. PATENT DOCUMENTS

2005/0217766 A1   10/2005   Fukuzumi et al.

FOREIGN PATENT DOCUMENTS

| JP | S61-183442 A | 8/1986 |
|---|---|---|
| JP | S62-44560 A | 2/1987 |
| JP | H01-319650 A | 12/1989 |
| JP | 2003-105496 A | 4/2003 |
| JP | 2004-169142 A | 6/2004 |
| JP | 2005-350736 A | 12/2005 |
| JP | 2012-062496 A | 3/2012 |

(Continued)

OTHER PUBLICATIONS

Nov. 18, 2014 International Search Report issued in International Patent Application No. PCT/JP2014/004722.
Cui, Juan et al. "Investigation on Decarburizing Characteristic of Medium Carbon Spring Steel in Heating Process". Material and Heat Treatment, 2007, pp. 20-23.
Cao, Anran et al. "Research of oxidation and decarburization behavior of spring steel55 SiCr". Heat Treatment of Metals, vol. 35, 9., Sep. 2010, pp. 51-55.

(Continued)

*Primary Examiner* — Deborah Yee
(74) *Attorney, Agent, or Firm* — Oliff PLC

(57) ABSTRACT

Provided is high strength steel for springs that, compared to conventional high strength steel for springs, has excellent decarburization resistance and scale exfoliation property, by optimization of the added amounts of C, Si, Mn, and Cr as well as of Sb and Sn. The steel for springs contains C: more than 0.45 mass % and less than 0.65 mass %, Si: 0.15 mass % or more and 0.70 mass % or less, Mn: 0.10 mass % or more and 1.00 mass % or less, Cr: 0.20 mass % or more and 1.50 mass % or less, P: 0.025 mass % or less, S: 0.025 mass % or less, O: 0.0015 mass % or less, Sb: 0.010 mass % or more and less than 0.030 mass %, and Sn: 0.010 mass % or more and 0.030 mass % or less, under predetermined conditions.

6 Claims, No Drawings

(56) References Cited

FOREIGN PATENT DOCUMENTS

WO      2013/035848 A1      3/2013
WO      2013/132829 A1      9/2013

OTHER PUBLICATIONS

Dec. 23, 2016 Office Action issued in Japanese Patent Application No. 201480049894.1.
Dec. 5, 2016 Search Report issued in Japanese Patent Application No. 201480049894.1.

STEEL FOR SPRING, AND METHOD FOR PRODUCING SPRING

TECHNICAL FIELD

This disclosure relates to steel for springs that is suitably used as the material of, for example, high strength springs, such as suspension springs, torsion bars, and stabilizers which are underbody members of automobiles, and springs for construction machinery and railway cars, and to a method for producing a spring using the steel for springs.

BACKGROUND

From the viewpoint of recent global environment, there are demands for reducing carbon dioxide emission, and therefore an increasingly high demand for reducing the weight of automobiles, construction machinery, and railway cars. Particularly, there is a strong demand for reducing weight of springs used therein, whereby high stress design is applied to these springs by using as a material thereof a strengthened material having a post quenching-tempering strength of about 1800 MPa or more.

General-purpose steel for springs has a post quenching-tempering strength of about 1600 to 1800 MPa, as prescribed in JIS G4801 and the like. Such steel for springs is manufactured into a predetermined wire rod by hot rolling, and the wire rod is thermally formed into a spring-like shape and subjected to quenching-tempering processes in the case of a hot formed spring. Alternatively, in the case of a cold formed spring, the wire rod is subjected to a drawing process and then to quenching-tempering processes and formed into a spring-like shape.

For example, in the case of a hot formed spring, the fatigue resistance of the spring is improved by applying compressive residual stress to the surface of the spring via shot peening after quenching-tempering.

The materials commonly used for the above-described springs include SUP9A described in JIS G4801. SUP9A is hot-formed into a spring-like shape, and compressive residual stress is applied to the surface via shot peening in order to improve fatigue resistance. When SUP9A, however, is manufactured into a predetermined wire rod by hot rolling, or heated for formation into a spring-like shape, the carbon in the surface layer is reduced, and total decarburization occurs. Hardness of the surface of the manufactured spring thus easily deteriorates, causing the application of compressive residual stress via shot peening to be insufficient, which adversely affects the properties of the spring (in particular, the fatigue property).

As stated above, since steel for springs is heated at least once for formation, carbon in the surface layer is reduced, and decarburization occurs. With respect to the decarburization, JIS G 0558 defines four types of decarburization layer depth: "depth of total decarburization layer", "depth of ferrite decarburization layer", "depth of decarburization layer with specified residual carbon ratio", and "depth of effective decarburization". In terms of decarburization of steel for springs, the "depth of ferrite decarburization layer" and the "depth of effective decarburization" are two problematic decarburization layer depths. The depth of ferrite decarburization layer is the depth of a layer measured from the surface of the steel material, in which layer the carbon content is nearly zero, so that despite rapid cooling after heating, the layer transforms into ferrite, and a ferrite phase forms. The depth of effective decarburization is the distance (depth) from the surface of the steel material to a position at which the carbon content is reduced compared to that of the base material, even though the carbon content does not reach zero, thereby causing hardness to deteriorate as compared to the base material in the case of rapid cooling after heating, yet an adequate hardness for practical purposes is obtained. In steel for springs, either a ferrite decarburization layer forms on the surface of the steel material with an effective decarburization occurring inwards from the ferrite decarburization layer, or depending on the chemical composition, an effective decarburization occurs without formation of a ferrite decarburization layer. As used herein, "decarburization" refers to effective decarburization. As described above, when such decarburization occurs near the steel material surface, compressive residual stress via shot peening cannot be applied sufficiently, resulting in the problem of an adverse effect on the properties of the spring, in particular the fatigue property.

A few proposals have been made to overcome this problem. JP2003105496A (PTL 1) describes high strength steel for springs that achieves low decarburization and excellent delayed fracture resistance by controlling the added amounts of C, Si, Mn, P, S, Cu, Ni, Cr, Mo, V, Nb, Ti, Al, N, and B, as well as controlling the added amount of the total of As, Sn, and Sb and the added amounts of Cu and Ni. PLT 1 teaches the relationship between decarburization depth and the added amount of the total of As, Sn, and Sb, yet even optimizing the added amount of the total of As, Sn, and Sb does not manage to suppress ferrite decarburization. Therefore, PTL 1 cannot necessarily suppress the decarburization occurring inwards from the ferrite decarburization layer.

JPS61183442A (PTL 2) describes steel for springs in which decarburization is suppressed by optimizing the added amounts of C, Si, Mn, Sb, As, and Sn. PTL 2 discloses the relationship between decarburization depth and the added amounts of As, Sn, and Sb as well as the added amount of the total of As, Sn, and Sb, yet even optimizing the added amount of the total of As, Sn, and Sb does not manage to suppress ferrite decarburization. Therefore, PTL 2 cannot necessarily suppress the decarburization occurring inwards from the ferrite decarburization layer.

JPH01319650A (PTL 3) describes steel for springs in which decarburization is suppressed by optimizing the added amounts of C, Si, Mn, Cr, and Sb. As stated later, however, if Sb is added more than required, scales grow more rapidly and increases in thickness during heating of the material, thereby making it difficult to exfoliate scales during production of the material and formation of springs, and deteriorating the scale exfoliation property. Therefore, surface defects occur due to scale biting during production of the material and formation of springs, deteriorating the fatigue property of the springs.

JP2004169142A (PTL 4) describes steel for springs in which quench hardenability and pitting corrosion resistance are improved by optimizing the added amounts of C, Si, Mn, Cr, Nb, Al, N, Ti, and B and by adding Sb as the selected element. It is difficult, however, to suppress decarburization by merely adding Sb alone and, as described below, if Sb is added more than required, scales grow more rapidly and increases in thickness during heating of the material, thereby making it difficult to exfoliate scales during production of the material and formation of springs, and deteriorating the scale exfoliation property. Therefore, the material and springs suffer surface defects due to scale biting during production of the material and formation of springs, thereby deteriorating the fatigue property of the springs.

As mentioned above, since steel for springs is heated at least once, scales form on the material surface. If the added amounts of As, Sn, and Sb are within the ranges described in PTL 1 to PTL 4, scales grow more rapidly during heating of the material and increases in thickness, which prevents exfoliation of scales formed during the production of material and the formation of springs, and causes a surface indentation flaw, resulting in the problem of deteriorating the fatigue property of the resulting steel for springs. There is thus demand for steel for springs that exhibits an excellent scale exfoliation property.

CITATION LIST

Patent Literature

PTL 1: JP2003105496A
PTL 2: JPS61183442A
PTL 3: JPH01319650
PTL 4: JP2004169142A

SUMMARY

Technical Problem

As described above, from the perspective of reducing carbon dioxide emission, further strengthening of springs used in automobiles, construction machinery, railway cars, and the like is an issue. Upon manufacturing of a predetermined material by hot rolling, however, or heating for formation into a spring-like shape, the carbon on the surface layer is reduced, and decarburization (ferrite decarburization and/or effective decarburization) occurs. Hardness of the surface of the manufactured spring thus easily deteriorates, causing the application of compressive residual stress via shot peening to be insufficient. This leads to the problem of an adverse effect on the properties of the spring, in particular the fatigue resistance. Furthermore, the above-described deterioration of scale exfoliation property is also a problem.

The present disclosure has been made to overcome the above problems, and it is an object thereof to provide high strength steel for springs that, compared to conventional high strength steel for springs, has an excellent decarburization resistance and scale exfoliation property, by optimization of the added amounts of C, Si, Mn, and Cr as well as of Sb and Sn.

Solution to Problem

We conceived of the importance of adjusting the ratio of addition of decarburization suppressing elements and decarburization promoting elements in order to suppress decarburization. In order to overcome the above problems, we focused on the added amounts of C, Si, Mn, and Cr as well as of Sb and Sn, and on the value of "A" (A value) expressed in Formula (1), the value of "B" (B value) expressed in Formula (2), and the value of "C" (C value) expressed in Formula (3) below. Specifically, we reasoned that the various properties necessary for steel for springs can be guaranteed by optimizing the added amounts of C, Si, Mn, and Cr, that decarburization can be suppressed by specifying, with the use of the value of A and B, the ratio of addition of elements that control promotion and suppression of total decarburization, and that a deterioration of scale exfoliation property can be suppressed by specifying, with the use of the value of B and C, the ratio of addition of elements that control scale exfoliation.

$$A=[C]/([Si]+[Sb]+[Sn]) \quad (1),$$

$$B=[Si]/([Sn]+[Sb]) \quad (2),$$

$$C=[Sb]+[Sn] \quad (3),$$

where brackets represent content in mass % of an element enclosed in the brackets.

To overcome the above problems, we manufactured high strength steel for springs by varying the added amounts of C, Si, Mn, and Cr as well as of Sb and Sn and by varying the value of A expressed in Formula (1), the value of B expressed in Formula (2), and the value of C expressed in Formula (3) above. We then intensely investigated the decarburization resistance and scale exfoliation property. As a result, the inventors discovered that controlling the added amounts of C, Si, Mn, and Cr and of Sb and Sn, as well as the value of A, B, and C, to be in appropriate ranges allows for an increase in the decarburization resistance and for suppression of deterioration of scale exfoliation property, thereby completing the present disclosure.

We thus provide:

1. Steel for springs, the steel comprising a chemical composition containing
C: 0.45 mass % or more and less than 0.65 mass %,
Si: 0.15 mass % or more and 0.70 mass % or less,
Mn: 0.10 mass % or more and 1.00 mass % or less,
Cr: 0.20 mass % or more and 1.50 mass % or less,
P: 0.025 mass % or less,
S: 0.025 mass % or less,
O: 0.0015 mass % or less,
Sb: 0.010 mass % or more and less than 0.030 mass %,
Sn: 0.010 mass % or more and 0.030 mass % or less, and
the balance being Fe and incidental impurities, and an A value calculated by Formula (1) being 0.65 or more and 3.50 or less, a B value calculated by Formula (2) being 3.10 or more and 34.00 or less, and a C value calculated by Formula (3) being 0.020 mass % or more and 0.050 mass % or less:

$$A=[C]/([Si]+[Sb]+[Sn]) \quad (1),$$

$$B=[Si]/([Sn]+[Sb]) \quad (2),$$

$$C=[Sb]+[Sn] \quad (3),$$

where brackets represent content in mass % of an element enclosed in the brackets.

2. The steel for springs according to aspect 1 above, wherein the chemical composition further contains one or more selected from the group consisting of
Al: 0.50 mass % or less,
Cu: 1.0 mass % or less,
Ni: 2.0 mass % or less,
W: 2.0 mass % or less,
Nb: 0.1 mass % or less,
Ti: 0.2 mass % or less,
V: 0.5 mass % or less,
Mo: 1.0 mass % or less, and
B: 0.005 mass % or less.

3. A method for producing a spring, the method comprising: subjecting a steel semi-finished product with the chemical composition as recited in aspect 1 or 2 above to hot rolling to be finished into a steel bar or a wire rod; and hot forming the steel bar or the wire rod into a spring-like shape.

4. The method for producing a spring according to aspect 3 above, wherein a D value calculated by Formula (4) is 125 or less, the D value being related to heating temperature T (° C.) during the hot forming and to Sb content [Sb](mass %) and Sn content [Sn] (mass %) in the steel semi-finished product:

$$D=6883.66\times[Sb]-5213.09\times[Sn]+0.65\times T-543.76 \quad (4).$$

Advantageous Effect

According to the disclosure, it is possible to produce high strength steel for springs in a stable manner such that the steel possesses much better decarburization resistance and scale exfoliation property than the conventional high strength steel for springs.

DETAILED DESCRIPTION

Firstly, a chemical composition of the high strength steel for springs according to the disclosure will be described.
C: 0.45 Mass % or More and Less than 0.65 Mass %

Carbon (C) is a necessary element for guaranteeing required strength. At a C content of less than 0.45 mass %, predetermined strength becomes difficult to guarantee. In order to guarantee predetermined strength, it becomes necessary to add a large amount of alloy elements, leading to an increased alloy cost. Accordingly, the content is set to be 0.45 mass % or more. Furthermore, a low C content facilitates decarburization. Conversely, addition of 0.65 mass % or more reduces toughness. In view of the above, the C content is to be 0.45 mass % or more and less than 0.65 mass %. The C content is preferably 0.46 mass % or more.

Si: 0.15 Mass % or More and 0.70 Mass % or Less

Si (silicon) is an element acting as a deoxidizing agent and enhancing the strength and sag resistance of steel by solid solution strengthening and by enhancing temper softening resistancy. At an Si content of less than 0.15 mass %, predetermined strength is difficult to guarantee. In order to guarantee predetermined strength, it becomes necessary to add a large amount of alloy elements, leading to an increased alloy cost. Accordingly, the content is set to be 0.15 mass % or more. Si is an element, however, that promotes decarburization and causes fayalite to form in scales, thereby deteriorating the scale exfoliation property. Thus, adding over 0.70 mass % promotes decarburization and makes scale exfoliation difficult. Accordingly, the upper limit on the Si content is set to 0.70 mass %. For these reasons, the Si content is set to be 0.15 mass % or more and 0.70 mass % or less. The Si content is preferably 0.69 mass % or less.

Mn: 0.10 Mass % or More and 1.00 Mass % or Less

Mn (manganese) is useful for improving quench hardenability of steel and increasing its strength, and therefore Mn is added to a content of 0.10 mass % or more. A content of over 1.0 mass %, however, strengthens the steel excessively, leading to a reduction in the toughness of the base material. Accordingly, the upper limit on the Mn content is set to 1.00 mass %. For these reasons, the Mn content is set to be 0.10 mass % or more and 1.00 mass % or less. The Mn content is preferably 0.12 mass % or more.

P: 0.025 Mass % or Less, S: 0.025 Mass % or Less

P (phosphorus) and S (sulfur) are segregated at the grain boundary, which leads to a reduction in the toughness of the base material. For this reason, it is preferable that these elements are reduced as much as possible. Therefore, P and S are each set to be contained in an amount of 0.025 mass % or less. While no particular lower limits are placed on the P and S contents, it is preferable in industrial terms that the lower limit on the reduction of the P and S contents is 0.0002 mass %, since reducing the P and S contents below 0.0002 mass % is expensive to implement.

Cr: 0.20 Mass % or More and 1.50 Mass % or Less

Cr (chromium) is an element that improves quench hardenability of steel and increases strength of the steel. Therefore, Cr is added in an amount of 0.20 mass % or more. A content of over 1.50 mass %, however, strengthens the steel excessively, leading to a reduction in the toughness of the base material. Furthermore, a Cr content exceeding 1.50 mass % results in inclusion of Cr in scales, leading to deterioration in the scale exfoliation property due to an anchoring effect. For these reasons, the Cr content is set to be 0.20 mass % or more and 1.50 mass % or less.

O: 0.0015 Mass % or Less

O (oxygen) is an element that bonds with Si or Al to form a hard oxide-based non-metal inclusion, which leads to deterioration in spring properties. As little O as possible is therefore preferable. In the present disclosure, however, up to 0.0015 mass % is acceptable. While no particular lower limit is placed on the O content, it is preferable in industrial terms that the lower limit on the reduction of the O content is 0.0002 mass %, since reducing the O content below 0.0002 mass % is expensive to implement.

Sb: 0.010 Mass % or More and Less than 0.030 Mass %

Sb (antimony) concentrates in the surface layer upon the material being heated, and has an effect of suppressing the reduction of the C amount in the surface layer during the heating. To obtain this effect, Sb is added in an amount of 0.010 mass % or more. Upon adding Sb in an amount of 0.030 mass % or more, however, Sb forms liquid metal during heating of the material, which erodes the prior austenite grain boundary and deteriorates the scale exfoliation property due to an anchoring effect. For these reasons, the Sb content is set to be 0.010 mass % or more and less than 0.030 mass %. The Sb content is preferably 0.029 mass % or less.

Sn: 0.010 Mass % or More and 0.030 Mass % or Less

Sn (tin) concentrates in the surface layer upon the material being heated, and has an effect of suppressing the reduction of the C amount in the surface layer during the heating. Furthermore, Sn has an effect of reducing the thickness of scales formed during heating of steel, and an effect of suppressing deterioration of the scale exfoliation property due to the addition of Sb. To obtain the effects, Sn is added in an amount of 0.010 mass % or more. Upon adding an amount of Sn exceeding 0.030 mass %, however, Sn forms liquid metal during heating of the material, which erodes the prior austenite grain boundary and deteriorates the scale exfoliation property due to an anchoring effect. For these reasons, the Sn content is set to be 0.010 mass % or more and 0.030 mass % or less. The Sn content is preferably 0.029 mass % or less.

A Value (Expressed in Formula (1)): 0.65 or More and 3.50 or Less

The A value, which is calculated by Formula (1) below, is an index that affects suppression of decarburization. An A value exceeding 3.50 indicates a large added amount of C, or low added amounts of Sb and Sn for the same added amount of C. Specifically, a large added amount of C leads to a reduction in toughness, while low added amounts of Sb and Sn end up increasing decarburization. On the other hand, an A value below 0.65 indicates a low added amount of C or large added amounts of Si, Sb, and Sn, resulting in deterioration of the scale exfoliation property. For these reasons, the A value is set to be 0.65 or more and 3.50 or less. The A value is preferably 0.66 or more.

$$A=[C]/([Si]+[Sb]+[Sn]) \quad (1),$$

where brackets represent content in mass % of an element enclosed in the brackets.

B Value (Expressed in Formula (2)): 3.10 or More and 34.00 or Less

The B value, which is calculated by Formula (2) below, is an index that affects suppression of decarburization. The B value is also an indicator used to control the scale thickness and the scale composition. If the B value is below 3.10, large amount of Sb and Sn need to be added, and these elements form liquid metal during heating of the material, which erodes the prior austenite grain boundary and deteriorates the scale exfoliation property due to an anchoring effect. On the other hand, a B value exceeding 34.00 indicates a large added amount of Si, which promotes decarburization. For these reasons, the B value is set to be 3.10 or more and 34.00 or less. The B value is preferably 3.13 or more.

$$B=[Si]/([Sn]+[Sb]) \quad (2),$$

where brackets represent content in mass % of an element enclosed in the brackets.

C Value (Expressed in Formula (3)): 0.020 Mass % or More and 0.050 Mass % or Less The C value, which is calculated by Formula (3) below, is an index that affects suppression of decarburization, and suppression of formation of liquid metal by Sb and Sn during heating of the material, erosion of the prior austenite grain boundary by the liquid metal, and the consequent deterioration of the scale exfoliation property due to an anchoring effect. A C value below 0.020 mass % promotes decarburization. Furthermore, if the C value exceeds 0.05 mass %, Sb and Sn form liquid metal during heating of the material, which erodes the prior austenite grain boundary and deteriorates the scale exfoliation property due to an anchoring effect. For these reasons, the C value is set to be 0.020 mass % or more and 0.050 mass % or less.

$$C=[Sb]+[Sn] \quad (3),$$

where brackets represent content in mass % of an element enclosed in the brackets.

Furthermore, in addition to the above basic components, one or more of the following chemical elements may be added as necessary:
Al: 0.50 mass % or less; Cu: 1.0 mass % or less; Ni: 2.0 mass % or less; W: 2.0 mass % or less; Nb: 0.1 mass % or less; Ti: 0.2 mass % or less; V: 0.5 mass % or less; Mo: 1.00 mass % or less; and B: 0.005 mass % or less Cu (copper) and Ni (nickel) are elements that improve quench hardenability and strength after tempering of steel and therefore may be selectively added. To achieve such effects, Cu and Ni are preferably added in an amount of 0.005 mass % or more. However, Cu content exceeding 1.0 mass % and Ni content exceeding 2.0 mass % end up increasing alloy costs. Thus, the upper limit on the addition of Cu is preferably 1.0 mass %, and the upper limit on the addition of Ni is preferably 2.0 mass %, more preferably 1.0 mass %.

Al (aluminum) is an element that can be added as a deoxidizer and that also suppresses growth of austenite grains during quenching to effectively maintain strength of the steel. Al is thus preferably added in an amount of 0.01 mass % or more. However, adding Al beyond 0.50 mass % fails to further increase this effect, but instead disadvantageously increases cost. Furthermore, in the case of cold-forming into a spring-like shape, a high Al content deteriorates formability of the steel. The upper limit on the addition of Al is therefore preferably 0.50 mass %. More preferably, the Al content is 0.01 mass % or more and 0.300 mass % or less.

W (tungsten), Nb (niobium), Ti (titanium) and V (vanadium) are elements that each enhance the quench hardenability and post-tempering strength of the steel, and may be selectively added to the steel depending on the required strength. To achieve these effects, W, Nb, and Ti are preferably each added in an amount of 0.001 mass % or more, and V is preferably added in an amount of 0.002 mass % or more.

However, a V content exceeding 0.5 mass %, Nb content exceeding 0.1 mass %, and Ti content exceeding 0.2 mass % result in a large amount of carbides generated in the steel, excessively increasing strength of the steel and lessening toughness. It is thus preferable that Nb, Ti, and V are each added in an amount up to the above-identified upper limit. Furthermore, W content in steel exceeding 2.0 mass % excessively increases strength and lessens toughness, leading to an increase in alloy cost. The upper limit on the addition of W is therefore preferably 2.0 mass %. A more preferred upper limit on the addition of W is 1.0 mass %.

Mo (molybdenum) is an element that improves quench hardenability and strength after tempering of steel and therefore may be selectively added. To achieve such effects, Mo is preferably added in an amount of 0.01 mass % or more. However, Mo content exceeding 1.00 mass % ends up increasing alloy costs. The upper limit on the addition of Mo is therefore preferably 1.00 mass %. More preferably, the Mo content is 0.01 mass % or more and 0.80 mass % or less.

B (boron) is an element that enhances strength of steel after tempering through an increase in quench hardenability and may be added as necessary. To achieve this effect, B is preferably added in an amount of 0.0002 mass % or more. However, adding B to steel in an amount exceeding 0.005 mass % deteriorates cold formability of the steel. B is thus preferably added in an amount within a range of 0.0002 mass % to 0.005 mass %.

The following describes a method for producing steel for springs and a method for producing a spring using the steel for springs according to the disclosure.

Any steel material (steel semi-finished product) with the above chemical composition may be used in steelmaking either with a converter or vacuum melting. Steel material such as a steel ingot, a slab, a bloom, or a billet is subjected to heating and hot rolling to be finished into, preferably, a steel bar or a wire rod, for use as steel for springs. Any steel for springs with the above chemical composition may suppress decarburization at a heating stage during hot rolling, and make any scales formed at the heating stage easier to exfoliate. This may prevent such scales from being pressed into the material surface and causing a surface indentation flaw in a subsequent process for formation of the steel bar or the wire rod into a spring-like shape. Note that the hot-rolled steel bar or wire rod may be subjected to descaling such as via shot peening as necessary to obtain steel for springs.

A particularly preferred method for producing a spring using the steel for springs thus obtained is a method combined with hot forming. In the case of forming into a spring-like shape by hot forming, the steel for springs obtained as above is subjected to coiling and hot forming such as hot setting, then formed into a spring-like shape, and subjected to quenching-tempering processes. In the case of hot forming the steel for springs with the above chemical composition as the material, decarburization can be suppressed during the hot forming, and any scales formed during the hot forming will have a good exfoliation property. This may prevent scales from being pressed into the material surface and causing a surface indentation flaw in a process for formation of the steel bar or the wire rod into a spring-like shape.

To prevent the increase of deformation resistance of the material during hot forming and the consequent deterioration of formability, heating temperature T during the hot forming is preferably set to be 850° C. or higher.

Furthermore, controlling the heating temperature T (° C.) during hot forming within a range in which the D value calculated by Formula (4) above is 125 or less is preferable from the viewpoint of reducing the thickness of scales formed during hot forming, improving the scale exfoliation property, and suppressing the occurrence of a surface indentation flaw in the spring surface during formation of the steel bar or the wire rod into a spring-like shape, to thereby prolong the fatigue life of springs.

Here, the D value is an indicator for expressing the scale thickness after heating. Specifically, our investigation revealed that the scale thickness of any steel with the above chemical composition after being heated varies with Sb content (mass %) [Sb], Sn content (mass %) [Sn], and heating temperature T (° C.), and is correlated with the D value calculated by Formula (4) below. It was also found that when the D value is 125 or less, the thickness of scales formed during heating decreases and the scale exfoliation property improves more. Accordingly, the heating temperature T (° C.) is preferably set in such a way that the D value is 125 or less, more preferably 19 or more.

$$D=6883.66\times[Sb]-5213.09\times[Sn]+0.65\times T-543.76 \quad (4)$$

Here, the D value becomes smaller with decreasing Sb content, increasing Sn content, and decreasing heating temperature T. As described above, the lower limit of Sb content is 0.01 mass %, the upper limit of Sn content is 0.03 mass %, and the heating temperature T is preferably 850° C. or higher, and accordingly, substituting these values in the right side of Formula (4) yields −79, which is a preferred lower limit of the D value.

Note that as preferred quenching-tempering processes, quenching is performed from austenite range and tempering is carried out by heating to temperatures of 200° C. to 420° C. Moreover, the quenching-tempering processes may be followed by an additional well-known process such as shot peening.

Despite being manufacturable at low cost, the high strength steel for springs obtained in this way has an excellent decarburization resistance and scale exfoliation property. This steel can, for example, therefore be applied to suspension springs which are underbody members of automobiles and to suspension springs used in construction machinery, railway cars, and the like.

EXAMPLES

Example 1

Steel samples having the chemical compositions shown in Table 1 were prepared by steelmaking with a vacuum melting furnace to produce steel ingots from these steel samples. The steel ingots were heated to 1050° C. and then subjected to hot rolling to be finished to steel bars with a diameter of 42 mm. The atmosphere during heating was an M gas atmosphere, yet heating may be performed under a different atmosphere (for example, air, LNG, city gas, a mixed gas such as COG/BFG, COG, heavy oil, nitrogen, argon, and the like). Samples (diameter: 42 mm, length: 10 mm) were taken from the steel bars after being subjected to the hot rolling. Decarburization resistance and scale exfoliation properties were then tested using the below-described methods.

[Decarburization Resistance]

Decarburization resistance was evaluated by heating, cooling (quenching), and tempering samples that were cut from the hot-rolled steel bars into pieces of 10 mm in the longitudinal direction (rolling direction), and measuring the change in hardness of the processed samples in the depth direction from the surface layer. The method of evaluation is as follows. The samples were heated under an atmosphere of air to 1000° C. for 30 minutes and subsequently cooled in 60° C. oil. Tempering was conducted under the following conditions: the samples were heated under an atmosphere of air to 400° C. for 60 minutes and then watercooled. Subsequently, in order to perform hardness measurement on a cut surface (a cross-section with a diameter of 42 mm perpendicular to the longitudinal direction; referred to below as "C cross-section"), the resulting test pieces were embedded in resin, and hardness was measured after mirror polishing the C cross-section. Hardness was measured using the measurement method according to the hardness test listed in the "Steel decarburization depth measurement method" of JIS G 0558. Specifically, the conditions were as follows. Measurement was performed in a micro hardness tester manufactured by Akashi Corporation (HM-115, Vickers hardness) with a load of 0.98 N and 25 μm pitch. In the results, total decarburization depth was defined as a region with a Vickers hardness of less than HV400.

[Scale Exfoliation Property]

The scale exfoliation property was evaluated by cutting hot-rolled steel bars into test pieces of 10 mm in the longitudinal direction (rolling direction) from the respective edges, heating the test pieces to the respective temperatures as listed in Table 2, and immediately watercooling them to observe scales exfoliated during the watercooling process. Additionally, cellophane tape was applied to a surface of each heat-treated test piece (42 mmφ in diameter) and pulled off to investigate the exfoliated scales being stuck to the tape, based on which the determination was made in combination with the results of observing the scales exfoliated during the watercooling process. In evaluation of the scale exfoliation property during the watercooling process and the scale exfoliation property determined using cellophane tape, the following criteria were considered:

1: severe exfoliation (the mean equivalent circle diameter of exfoliated scales was 5 mm or more)
2: moderate exfoliation (the mean equivalent circle diameter of exfoliated scales was 3 mm or more and less than 5 mm)
3: mild exfoliation (the mean equivalent circle diameter of exfoliated scales was 1 mm or more and less than 3 mm)
4: trivial exfoliation (the mean equivalent circle diameter of exfoliated scales was less than 1 mm)
5: no exfoliation (scales did not exfoliate)

The scale exfoliation property was evaluated based on the sum of the scores of evaluations made on the scales exfoliated during the watercooling process and on the exfoliated scales being stuck to the tape; those with scores of 6 or lower were considered to have a good scale exfoliation property.

[Tensile Strength]

The above-described steel bars with a 42 mm diameter were heated under an atmosphere of air at 900° C. for 30 minutes and subsequently cooled in 60° C. oil. Tempering was conducted under the following conditions: the samples were heated under an atmosphere of air at 400° C. for 60 minutes and then watercooled. Next, from the resulting test pieces, tensile test pieces listed in ASTM E8 with a diameter of 6 mm were collected centering on a position of ¼×

Diameter from the surface of each steel bar ("Diameter" being the diameter of the steel bar). The tensile strength was then calculated by performing a test with a gauge length of 24 mm and a tension speed of 5 mm/min. In the present disclosure, a tensile strength of 1730 MPa or more was evaluated as being good. The reason is that a tensile strength below 1730 MPa leads to a reduction in the fatigue strength of the spring.

C. was 20 J/cm$^2$ or more, the toughness was evaluated as being good. The reason is that since the impact property is one of the properties required for steel for springs, in the present disclosure a test specimen with a toughness of at least 1.5 times higher than that of the reference steel was judged to have good toughness, and an impact property of 20 J/cm$^2$ or more was evaluated as being good.

TABLE 1

| Steel No. | Chemical Composition (mass %) | | | | | | | | | A Value | B Value | C Value | Remarks |
| --- | --- | --- | --- | --- | --- | --- | --- | --- | --- | --- | --- | --- | --- |
| | C | Si | Mn | P | S | Cr | Sn | Sb | O | | | | |
| A-1 | 0.59 | 0.26 | 0.84 | 0.011 | 0.009 | 0.84 | — | — | 0.0009 | 2.27 | — | — | Reference Steel |
| A-2 | 0.56 | 0.35 | 0.45 | 0.008 | 0.002 | 1.15 | 0.015 | 0.015 | 0.0009 | 1.47 | 11.67 | 0.030 | Steel of Disclosure |
| A-3 | 0.51 | 0.15 | 0.25 | 0.007 | 0.003 | 0.95 | 0.017 | 0.018 | 0.0008 | 2.76 | 4.29 | 0.035 | Steel of Disclosure |
| A-4 | 0.53 | 0.23 | 0.34 | 0.005 | 0.001 | 1.03 | 0.018 | 0.019 | 0.0008 | 1.99 | 6.22 | 0.037 | Steel of Disclosure |
| A-5 | 0.64 | 0.69 | 0.12 | 0.005 | 0.002 | 0.20 | 0.024 | 0.024 | 0.0007 | 0.87 | 14.38 | 0.048 | Steel of Disclosure |
| A-6 | 0.46 | 0.15 | 1.00 | 0.006 | 0.003 | 0.60 | 0.010 | 0.010 | 0.0009 | 2.71 | 7.50 | 0.020 | Steel of Disclosure |
| A-7 | 0.49 | 0.15 | 0.26 | 0.008 | 0.004 | 0.99 | 0.016 | 0.015 | 0.0008 | 2.71 | 4.84 | 0.031 | Steel of Disclosure |
| A-8 | 0.57 | 0.70 | 0.44 | 0.005 | 0.005 | 1.10 | 0.018 | 0.017 | 0.0008 | 0.78 | 20.00 | 0.035 | Steel of Disclosure |
| A-9 | 0.47 | 0.67 | 0.65 | 0.006 | 0.003 | 0.44 | 0.020 | 0.020 | 0.0007 | 0.66 | 16.75 | 0.040 | Steel of Disclosure |
| A-10 | 0.60 | 0.15 | 1.00 | 0.006 | 0.003 | 1.50 | 0.011 | 0.011 | 0.0007 | 3.49 | 6.82 | 0.022 | Steel of Disclosure |
| A-11 | 0.57 | 0.68 | 0.44 | 0.007 | 0.003 | 0.20 | 0.010 | 0.010 | 0.0009 | 0.81 | 34.00 | 0.020 | Steel of Disclosure |
| A-12 | 0.64 | 0.15 | 0.75 | 0.005 | 0.003 | 1.35 | 0.024 | 0.024 | 0.0010 | 3.23 | 3.13 | 0.048 | Steel of Disclosure |
| A-13 | 0.55 | 0.49 | 0.50 | 0.007 | 0.003 | 1.11 | 0.017 | 0.018 | 0.0010 | 1.05 | 14.00 | 0.035 | Steel of Disclosure |
| A-14 | 0.52 | 0.17 | 0.90 | 0.007 | 0.001 | 0.77 | 0.012 | 0.018 | 0.0010 | 2.60 | 5.67 | 0.030 | Steel of Disclosure |
| A-15 | 0.56 | 0.70 | 1.00 | 0.006 | 0.003 | 0.35 | 0.020 | 0.025 | 0.0009 | 0.75 | 15.56 | 0.045 | Steel of Disclosure |
| A-16 | 0.54 | 0.68 | 0.95 | 0.007 | 0.003 | 0.55 | 0.018 | 0.018 | 0.0009 | 0.75 | 18.89 | 0.036 | Steel of Disclosure |
| A-17 | 0.55 | 0.65 | 0.51 | 0.006 | 0.002 | 0.57 | 0.019 | 0.018 | 0.0008 | 0.80 | 17.57 | 0.037 | Steel of Disclosure |
| A-18 | 0.52 | 0.18 | 0.12 | 0.006 | 0.002 | 1.00 | 0.018 | 0.017 | 0.0008 | 2.42 | 5.14 | 0.035 | Steel of Disclosure |
| A-19 | 0.47 | 0.69 | 0.65 | 0.007 | 0.001 | 0.43 | 0.020 | 0.020 | 0.0007 | <u>0.64</u> | 17.25 | 0.040 | Comparative Steel |
| A-20 | 0.60 | 0.15 | 1.00 | 0.006 | 0.003 | 1.50 | 0.010 | 0.010 | 0.0007 | <u>3.53</u> | 7.50 | 0.020 | Comparative Steel |
| A-21 | 0.58 | 0.69 | 0.44 | 0.007 | 0.003 | 0.10 | 0.010 | 0.010 | 0.0009 | 0.82 | <u>34.50</u> | 0.020 | Comparative Steel |
| A-22 | 0.63 | 0.15 | 0.75 | 0.005 | 0.003 | 1.35 | 0.025 | 0.025 | 0.0010 | 3.15 | <u>3.00</u> | 0.050 | Comparative Steel |
| A-23 | 0.53 | 0.48 | 0.59 | 0.006 | 0.001 | 1.01 | 0.009 | 0.009 | 0.0011 | 1.06 | 26.67 | 0.018 | Comparative Steel |
| A-24 | 0.54 | 0.46 | 0.57 | 0.005 | 0.002 | 0.99 | 0.027 | 0.025 | 0.0009 | 1.05 | 8.85 | 0.052 | Comparative Steel |
| A-25 | <u>0.44</u> | 0.24 | 0.35 | 0.004 | 0.001 | 1.02 | 0.018 | 0.019 | 0.0009 | 1.59 | 6.49 | 0.037 | Comparative Steel |
| A-26 | <u>0.65</u> | 0.23 | 0.34 | 0.005 | 0.001 | 1.03 | 0.018 | 0.019 | 0.0010 | 2.43 | 6.22 | 0.037 | Comparative Steel |
| A-27 | 0.62 | <u>0.71</u> | 0.51 | 0.006 | 0.002 | 0.54 | 0.011 | 0.011 | 0.0008 | 0.85 | 32.27 | 0.022 | Comparative Steel |
| A-28 | 0.53 | <u>0.14</u> | 0.51 | 0.006 | 0.002 | 0.56 | 0.010 | 0.012 | 0.0008 | 3.27 | 6.36 | 0.022 | Comparative Steel |
| A-29 | 0.52 | 0.19 | <u>0.05</u> | 0.007 | 0.003 | 1.00 | 0.017 | 0.016 | 0.0008 | 2.33 | 5.76 | 0.033 | Comparative Steel |
| A-30 | 0.51 | 0.18 | <u>1.05</u> | 0.005 | 0.001 | 1.01 | 0.019 | 0.018 | 0.0008 | 2.35 | 4.86 | 0.037 | Comparative Steel |
| A-31 | 0.59 | 0.15 | 0.99 | 0.006 | 0.001 | <u>0.15</u> | 0.013 | 0.012 | 0.0007 | 3.37 | 6.00 | 0.025 | Comparative Steel |
| A-32 | 0.60 | 0.15 | 0.98 | 0.006 | 0.002 | <u>1.55</u> | 0.011 | 0.015 | 0.0007 | 3.41 | 5.77 | 0.026 | Comparative Steel |
| A-33 | 0.53 | 0.22 | 0.35 | 0.005 | 0.001 | 1.00 | <u>0.009</u> | 0.018 | 0.0008 | 2.15 | 8.15 | 0.027 | Comparative Steel |
| A-34 | 0.53 | 0.24 | 0.36 | 0.004 | 0.001 | 1.01 | <u>0.032</u> | 0.015 | 0.0008 | 1.85 | 5.11 | 0.047 | Comparative Steel |
| A-35 | 0.62 | 0.15 | 0.75 | 0.005 | 0.003 | 1.35 | 0.017 | <u>0.032</u> | 0.0010 | 3.12 | 3.06 | 0.049 | Comparative Steel |
| A-36 | 0.61 | 0.16 | 0.77 | 0.005 | 0.003 | 1.34 | 0.017 | <u>0.009</u> | 0.0011 | 3.28 | 6.15 | 0.026 | Comparative Steel |
| A-37 | 0.47 | 0.67 | 0.65 | 0.006 | 0.001 | 0.44 | 0.011 | — | 0.0008 | 0.69 | <u>60.91</u> | <u>0.011</u> | Comparative Steel |
| A-38 | 0.47 | 0.67 | 0.65 | 0.006 | 0.001 | 0.44 | — | 0.011 | 0.0008 | 0.69 | <u>60.91</u> | <u>0.011</u> | Comparative Steel |
| A-39 | 0.55 | 0.65 | 0.51 | 0.006 | 0.002 | 0.57 | 0.019 | 0.018 | 0.0008 | 0.80 | 17.57 | 0.037 | Steel of Disclosure |
| A-40 | 0.52 | 0.18 | 0.12 | 0.006 | 0.002 | 1.00 | 0.018 | 0.017 | 0.0008 | 2.42 | 5.14 | 0.035 | Steel of Disclosure |
| A-41 | 0.56 | 0.35 | 0.45 | 0.008 | 0.002 | 1.15 | 0.015 | 0.015 | 0.0009 | 1.47 | 11.67 | 0.030 | Steel of Disclosure |
| A-42 | 0.51 | 0.15 | 0.25 | 0.007 | 0.003 | 0.95 | 0.017 | 0.018 | 0.0008 | 2.76 | 4.29 | 0.035 | Steel of Disclosure |
| A-43 | 0.52 | 0.17 | 0.90 | 0.007 | 0.001 | 0.77 | 0.012 | 0.018 | 0.0010 | 2.60 | 5.67 | 0.030 | Steel of Disclosure |

Note:
Figures underlined if outside the scope of the disclosure.

[Toughness]

The above-described steel bars with a 42 mm diameter were heated under an atmosphere of air at 970° C. for 30 minutes and subsequently cooled in 60° C. oil. Tempering was conducted under the following conditions: the samples were heated under an atmosphere of air at 400° C. for 60 minutes and then watercooled. Then, from the resulting test pieces, U notched test pieces as listed in JIS Z 2242 were collected centering on a position of ¼×Diameter from the surface of each steel bar ("Diameter" being the diameter of the steel bar), and a test was performed at a test temperature of 20° C. If the impact property at a test temperature of 20°

Table 2 lists the results for decarburization depth, scale exfoliation property, tensile strength, and toughness. Steel samples A-2 through A-18 with a chemical composition and A, B, and C values according to the present disclosure suffered no decarburization and had a good scale exfoliation property. By contrast, steel samples A-19 through A-38, for which one or more of the chemical composition, the A value, the B value, and the C value were outside of the range of the present disclosure, suffered decarburization, had an inferior scale exfoliation property, had a tensile strength of less than 1730 MPa, or had a toughness of less than 20 J/cm$^2$. Furthermore, steel samples A-2 through A-18 with a D value of 125 or less, which is inside of the range of the present disclosure, each had a better scale exfoliation property over steel samples A-39 through A-43 with a D value of more than 125.

TABLE 2

| Steel No. | Heating Temp. for Evaluation of Scale Exfoliation Property (° C.) | D Value | Decarburization Depth (mm) | Scale Exfoliation Property Water-cooling | Tape | Sum | Tensile Strength (MPa) | Toughness (J/cm$^2$) | Remarks |
|---|---|---|---|---|---|---|---|---|---|
| A-1 | 980 | 93 | 0.075 | 2 | 4 | 6 | 1811 | 12.7 | Reference Steel |
| A-2 | 910 | 73 | 0.000 | 1 | 4 | 5 | 1782 | 32.1 | Steel of Disclosure |
| A-3 | 910 | 83 | 0.000 | 2 | 4 | 6 | 1741 | 33.3 | Steel of Disclosure |
| A-4 | 900 | 78 | 0.000 | 2 | 4 | 6 | 1755 | 34.1 | Steel of Disclosure |
| A-5 | 950 | 114 | 0.000 | 1 | 4 | 5 | 1732 | 34.2 | Steel of Disclosure |
| A-6 | 900 | 58 | 0.000 | 2 | 4 | 6 | 1756 | 33.9 | Steel of Disclosure |
| A-7 | 900 | 61 | 0.000 | 2 | 4 | 6 | 1741 | 34.3 | Steel of Disclosure |
| A-8 | 950 | 97 | 0.000 | 1 | 3 | 4 | 1844 | 31.1 | Steel of Disclosure |
| A-9 | 950 | 107 | 0.000 | 1 | 3 | 4 | 1748 | 34.0 | Steel of Disclosure |
| A-10 | 950 | 92 | 0.000 | 1 | 4 | 5 | 1923 | 30.1 | Steel of Disclosure |
| A-11 | 900 | 58 | 0.000 | 1 | 4 | 5 | 1735 | 34.5 | Steel of Disclosure |
| A-12 | 920 | 94 | 0.000 | 2 | 4 | 6 | 1942 | 30.0 | Steel of Disclosure |
| A-13 | 900 | 77 | 0.000 | 2 | 4 | 6 | 1828 | 32.0 | Steel of Disclosure |
| A-14 | 910 | 109 | 0.000 | 1 | 4 | 5 | 1783 | 33.7 | Steel of Disclosure |
| A-15 | 850 | 77 | 0.000 | 2 | 4 | 6 | 1778 | 33.6 | Steel of Disclosure |
| A-16 | 910 | 78 | 0.000 | 1 | 5 | 6 | 1939 | 30.2 | Steel of Disclosure |
| A-17 | 910 | 73 | 0.000 | 1 | 5 | 6 | 1859 | 31.9 | Steel of Disclosure |
| A-18 | 900 | 64 | 0.000 | 2 | 4 | 6 | 1801 | 32.3 | Steel of Disclosure |
| A-19 | 950 | 107 | 0.000 | 3 | 5 | 8 | 1737 | 33.8 | Comparative Steel |
| A-20 | 950 | 90 | 0.100 | 3 | 5 | 8 | 1873 | 31.4 | Comparative Steel |
| A-21 | 950 | 90 | 0.075 | 3 | 5 | 8 | 1732 | 34.0 | Comparative Steel |
| A-22 | 950 | 116 | 0.000 | 3 | 5 | 8 | 1932 | 30.1 | Comparative Steel |
| A-23 | 950 | 89 | 0.075 | 2 | 4 | 6 | 1853 | 32.5 | Comparative Steel |
| A-24 | 950 | 105 | 0.000 | 3 | 5 | 8 | 1854 | 32.1 | Comparative Steel |
| A-25 | 950 | 111 | 0.050 | 2 | 4 | 6 | 1696 | 34.7 | Comparative Steel |
| A-26 | 950 | 111 | 0.000 | 2 | 4 | 6 | 1974 | 14.3 | Comparative Steel |
| A-27 | 950 | 92 | 0.125 | 3 | 5 | 8 | 1895 | 16.3 | Comparative Steel |
| A-28 | 950 | 104 | 0.000 | 2 | 4 | 6 | 1716 | 34.3 | Comparative Steel |
| A-29 | 950 | 95 | 0.000 | 2 | 4 | 6 | 1724 | 34.5 | Comparative Steel |
| A-30 | 950 | 99 | 0.000 | 2 | 4 | 6 | 1866 | 15.3 | Comparative Steel |
| A-31 | 950 | 89 | 0.000 | 2 | 4 | 6 | 1714 | 34.6 | Comparative Steel |
| A-32 | 950 | 120 | 0.000 | 3 | 5 | 8 | 1930 | 18.2 | Comparative Steel |
| A-33 | 910 | 125 | 0.075 | 2 | 4 | 6 | 1750 | 33.9 | Comparative Steel |
| A-34 | 1000 | 43 | 0.000 | 3 | 5 | 8 | 1775 | 33.4 | Comparative Steel |
| A-35 | 820 | 121 | 0.000 | 3 | 5 | 8 | 1922 | 30.1 | Comparative Steel |
| A-36 | 950 | 47 | 0.075 | 2 | 5 | 7 | 1914 | 30.3 | Comparative Steel |
| A-37 | 1000 | 49 | 0.050 | 2 | 4 | 6 | 1748 | 33.9 | Comparative Steel |
| A-38 | 910 | 123 | 0.050 | 2 | 4 | 6 | 1748 | 33.7 | Comparative Steel |
| A-39 | 1000 | 131 | 0.000 | 2 | 5 | 7 | 1858 | 31.4 | Steel of Disclosure |
| A-40 | 1000 | 129 | 0.000 | 2 | 5 | 7 | 1802 | 31.9 | Steel of Disclosure |
| A-41 | 1000 | 131 | 0.000 | 2 | 5 | 7 | 1782 | 31.9 | Steel of Disclosure |
| A-42 | 980 | 129 | 0.000 | 2 | 5 | 7 | 1741 | 33.1 | Steel of Disclosure |
| A-43 | 940 | 129 | 0.000 | 2 | 5 | 7 | 1793 | 33.5 | Steel of Disclosure |

Example 2

Steel samples having the chemical compositions shown in Table 3 were prepared by steelmaking with a vacuum melting furnace to produce steel ingots from these steel samples. The steel ingots were heated to 1050° C. and then subjected to hot rolling to be finished to steel bars with a diameter of 42 mm. The atmosphere during heating was an M gas atmosphere, yet heating may be performed under a different atmosphere (for example, air, LNG, city gas, a mixed gas such as COG/BFG, COG, heavy oil, nitrogen, argon, and the like). Samples (diameter: 42 mm, length: 10 mm) were taken from the steel bars after being subjected to the hot rolling. Decarburization resistance was then tested using the above-described method. The scale exfoliation property of the steel for springs was also tested using the above-described method.

TABLE 3

| Steel No. | Chemical Composition (mass %) | | | | | | | | | | | | |
|---|---|---|---|---|---|---|---|---|---|---|---|---|---|
| | C | Si | Mn | P | S | Cr | Sn | Sb | O | As | Mo | Al | Cu |
| A-1 | 0.60 | 0.25 | 0.85 | 0.010 | 0.010 | 0.85 | — | — | 0.0010 | — | — | — | — |
| B-1 | 0.54 | 0.68 | 0.25 | 0.008 | 0.001 | 1.50 | 0.020 | 0.020 | 0.0009 | — | — | 0.031 | — |
| B-2 | <u>0.44</u> | 0.48 | 0.83 | 0.007 | 0.005 | 0.95 | 0.015 | 0.011 | 0.0011 | — | 0.10 | — | — |
| B-3 | 0.46 | 0.48 | 0.53 | 0.009 | 0.002 | 1.21 | 0.030 | 0.020 | 0.0011 | — | — | — | — |
| B-4 | 0.48 | 0.70 | 0.80 | 0.008 | 0.001 | 0.75 | 0.010 | 0.010 | 0.0011 | — | 0.25 | 0.035 | — |
| B-5 | 0.51 | 0.15 | 0.25 | 0.006 | 0.002 | 0.95 | 0.017 | 0.017 | 0.0009 | — | 0.35 | 0.045 | — |
| B-6 | 0.53 | 0.23 | 0.34 | 0.006 | 0.003 | 1.03 | 0.017 | 0.019 | 0.0007 | — | 0.45 | 0.052 | — |
| B-7 | 0.64 | 0.15 | 0.74 | 0.005 | 0.003 | 1.35 | 0.015 | 0.019 | 0.0010 | — | — | — | 0.11 |
| B-8 | 0.60 | 0.15 | 0.95 | 0.008 | 0.002 | 0.95 | 0.010 | 0.010 | 0.0011 | — | — | 0.035 | — |

TABLE 3-continued

| Steel No. | | | | | | | | | | | | | |
|---|---|---|---|---|---|---|---|---|---|---|---|---|---|
| B-9 | 0.54 | 0.50 | 0.02 | 0.004 | 0.003 | 0.72 | 0.025 | 0.019 | 0.0011 | — | 0.11 | 0.041 | — |
| B-10 | 0.64 | 0.15 | 0.95 | 0.005 | 0.002 | 1.11 | 0.025 | 0.011 | 0.0010 | — | 0.51 | — | — |
| B-11 | 0.61 | 0.31 | 0.82 | 0.005 | 0.003 | 0.85 | 0.022 | 0.018 | 0.0011 | — | — | 0.029 | 0.25 |
| B-12 | 0.64 | 0.69 | 0.92 | 0.007 | 0.003 | 0.22 | 0.019 | 0.029 | 0.0011 | — | 0.25 | 0.051 | — |
| B-13 | 0.52 | 0.17 | 0.90 | 0.007 | 0.001 | 0.77 | 0.012 | 0.018 | 0.0010 | — | — | — | — |
| B-14 | 0.56 | 0.70 | 1.00 | 0.006 | 0.003 | 0.35 | 0.020 | 0.025 | 0.0009 | — | 0.45 | — | — |
| B-15 | 0.54 | 0.68 | 0.95 | 0.007 | 0.003 | 0.55 | 0.018 | 0.018 | 0.0009 | — | — | — | — |
| B-16 | 0.55 | 0.65 | 0.51 | 0.006 | 0.002 | 0.57 | 0.019 | 0.018 | 0.0008 | — | — | 0.035 | — |
| B-17 | 0.53 | 0.23 | 0.34 | 0.006 | 0.002 | 1.03 | 0.018 | 0.019 | 0.0008 | — | 0.39 | 0.045 | — |
| B-18 | 0.51 | 0.25 | 0.36 | 0.005 | 0.003 | 1.00 | 0.015 | 0.016 | 0.0011 | 0.015 | — | — | — |
| B-19 | 0.55 | 0.35 | 0.91 | 0.005 | 0.002 | 0.56 | 0.032 | 0.015 | 0.0008 | — | — | 0.039 | — |
| B-20 | 0.55 | 0.34 | 0.89 | 0.006 | 0.003 | 0.54 | 0.015 | 0.031 | 0.0009 | — | — | 0.040 | — |
| B-21 | 0.47 | 0.55 | 0.77 | 0.006 | 0.002 | 0.89 | 0.008 | 0.009 | 0.0010 | — | 0.41 | 0.040 | — |
| B-22 | 0.53 | 0.22 | 0.34 | 0.004 | 0.001 | 1.03 | 0.015 | 0.018 | 0.0008 | — | — | 0.031 | 1.00 |
| B-23 | 0.52 | 0.23 | 0.35 | 0.005 | 0.002 | 1.01 | 0.015 | 0.017 | 0.0007 | — | 0.80 | 0.033 | — |
| B-24 | 0.53 | 0.24 | 0.34 | 0.003 | 0.001 | 1.00 | 0.018 | 0.018 | 0.0009 | — | — | 0.300 | — |
| B-25 | 0.54 | 0.23 | 0.34 | 0.005 | 0.001 | 1.02 | 0.018 | 0.019 | 0.0007 | — | — | 0.040 | — |
| B-26 | 0.53 | 0.23 | 0.33 | 0.005 | 0.003 | 1.00 | 0.018 | 0.019 | 0.0011 | — | — | 0.035 | — |
| B-27 | 0.53 | 0.22 | 0.34 | 0.006 | 0.001 | 0.99 | 0.015 | 0.019 | 0.0007 | — | — | 0.033 | — |
| B-28 | 0.52 | 0.24 | 0.32 | 0.005 | 0.001 | 1.03 | 0.016 | 0.018 | 0.0009 | — | — | 0.031 | — |
| B-29 | 0.53 | 0.22 | 0.34 | 0.005 | 0.002 | 1.00 | 0.018 | 0.017 | 0.0007 | — | — | 0.033 | — |

| Steel No. | Chemical Composition (mass %) | | | | | | A Value | B Value | C Value | Remarks |
|---|---|---|---|---|---|---|---|---|---|---|
| | Ni | W | Nb | Ti | V | B | | | | |
| A-1 | — | — | — | — | — | — | — | — | — | Reference Steel |
| B-1 | — | — | — | 0.035 | — | — | 0.75 | 17.00 | 0.040 | Steel of Disclosure |
| B-2 | — | — | — | — | — | — | 0.87 | 18.46 | 0.026 | Comparative Steel |
| B-3 | — | — | — | 0.021 | — | 0.0020 | 0.87 | 9.60 | 0.050 | Steel of Disclosure |
| B-4 | — | — | 0.011 | — | — | — | 0.67 | 35.00 | 0.020 | Comparative Steel |
| B-5 | — | — | 0.005 | 0.005 | — | — | 2.77 | 4.41 | 0.034 | Steel of Disclosure |
| B-6 | — | — | 0.035 | 0.005 | — | — | 1.99 | 6.39 | 0.036 | Steel of Disclosure |
| B-7 | 0.21 | — | — | — | — | — | 3.48 | 4.41 | 0.034 | Steel of Disclosure |
| B-8 | — | — | 0.011 | 0.032 | — | 0.0025 | 3.53 | 7.50 | 0.020 | Comparative Steel |
| B-9 | — | 0.11 | 0.015 | 0.025 | 0.12 | — | 0.99 | 11.36 | 0.044 | Steel of Disclosure |
| B-10 | — | — | — | — | — | — | 3.44 | 4.17 | 0.036 | Steel of Disclosure |
| B-11 | 0.50 | — | — | — | — | — | 1.74 | 7.75 | 0.040 | Steel of Disclosure |
| B-12 | — | — | — | — | — | — | 0.87 | 14.38 | 0.048 | Steel of Disclosure |
| B-13 | — | — | 0.040 | — | — | — | 2.60 | 5.67 | 0.030 | Steel of Disclosure |
| B-14 | — | — | — | 0.035 | — | 0.0015 | 0.75 | 15.56 | 0.045 | Steel of Disclosure |
| B-15 | — | — | — | — | 0.25 | — | 0.75 | 18.89 | 0.036 | Steel of Disclosure |
| B-16 | — | 0.50 | 0.020 | — | — | — | 0.80 | 17.57 | 0.037 | Steel of Disclosure |
| B-17 | — | — | 0.016 | 0.005 | — | — | 1.99 | 6.22 | 0.037 | Steel of Disclosure |
| B-18 | — | — | — | — | — | — | 1.81 | 8.06 | 0.031 | Comparative Steel |
| B-19 | — | — | — | — | 0.31 | — | 1.39 | 7.45 | 0.047 | Comparative Steel |
| B-20 | — | — | — | — | 0.29 | — | 1.42 | 7.39 | 0.046 | Comparative Steel |
| B-21 | — | — | 0.011 | — | — | — | 0.83 | 32.35 | 0.017 | Comparative Steel |
| B-22 | 1.00 | — | — | 0.035 | — | — | 2.09 | 6.67 | 0.033 | Steel of Disclosure |
| B-23 | — | — | — | — | — | — | 1.98 | 7.19 | 0.032 | Steel of Disclosure |
| B-24 | — | — | — | — | — | — | 1.92 | 6.67 | 0.036 | Steel of Disclosure |
| B-25 | — | — | — | 0.200 | — | — | 2.02 | 6.22 | 0.037 | Steel of Disclosure |
| B-26 | — | 1.00 | — | — | — | — | 1.99 | 6.22 | 0.037 | Steel of Disclosure |
| B-27 | — | — | 0.100 | 0.025 | — | — | 2.09 | 6.47 | 0.034 | Steel of Disclosure |
| B-28 | — | — | — | 0.022 | 0.50 | — | 1.90 | 7.06 | 0.034 | Steel of Disclosure |
| B-29 | — | — | — | 0.025 | — | 0.005 | 2.08 | 6.29 | 0.035 | Steel of Disclosure |

Table 4 lists the results for decarburization depth, scale exfoliation property, tensile strength, and toughness. Steel samples B-1, B-3, B-5 through B-7 and B-9 through B-17 with a chemical composition and A, B, and C values according to the present disclosure suffered no decarburization and had a good scale exfoliation property. By contrast, steel samples B-2, B-4, B-8, and B-18 through B-21, for which one or more of the chemical composition, the A value, the B value, and the C value were outside of the range of the present disclosure, suffered decarburization, had an inferior scale exfoliation property, had a tensile strength of less than 1730 MPa, or had a toughness of less than 20 J/cm$^2$.

TABLE 4

| Steel No. | Heating Temp. for Evaluation of Scale Exfoliation Property (° C.) | D Value | Decarburization Depth (mm) | Scale Exfoliation Property | | | Tensile Strength (MPa) | Toughness (J/cm$^2$) | Remarks |
|---|---|---|---|---|---|---|---|---|---|
| | | | | Water-cooling | Tape | Sum | | | |
| A-1 | 980 | 93 | 0.075 | 2 | 4 | 6 | 1811 | 12.7 | Reference Steel |
| B-1 | 950 | 107 | 0.000 | 1 | 4 | 5 | 1862 | 30.1 | Steel of Disclosure |

TABLE 4-continued

| Steel No. | Heating Temp. for Evaluation of Scale Exfoliation Property (° C.) | D Value | Decarburization Depth (mm) | Scale Exfoliation Property | | | Tensile Strength (MPa) | Toughness (J/cm²) | Remarks |
|---|---|---|---|---|---|---|---|---|---|
| | | | | Water-cooling | Tape | Sum | | | |
| B-2 | 950 | 71 | 0.050 | 2 | 4 | 6 | 1716 | 33.7 | Comparative Steel |
| B-3 | 910 | 29 | 0.000 | 1 | 4 | 5 | 1813 | 31.1 | Steel of Disclosure |
| B-4 | 960 | 97 | 0.075 | 3 | 5 | 8 | 1857 | 30.3 | Comparative Steel |
| B-5 | 970 | 115 | 0.000 | 1 | 4 | 5 | 1788 | 33.1 | Steel of Disclosure |
| B-6 | 950 | 116 | 0.000 | 1 | 5 | 6 | 1816 | 31.4 | Steel of Disclosure |
| B-7 | 920 | 107 | 0.000 | 1 | 4 | 5 | 1895 | 30.1 | Steel of Disclosure |
| B-8 | 935 | 81 | 0.100 | 2 | 4 | 6 | 1906 | 30.0 | Comparative Steel |
| B-9 | 930 | 61 | 0.000 | 2 | 4 | 6 | 1768 | 34.5 | Steel of Disclosure |
| B-10 | 950 | 19 | 0.000 | 2 | 4 | 6 | 1954 | 30.0 | Steel of Disclosure |
| B-11 | 1000 | 115 | 0.000 | 2 | 4 | 6 | 1893 | 30.9 | Steel of Disclosure |
| B-12 | 850 | 109 | 0.000 | 2 | 4 | 6 | 1860 | 31.2 | Steel of Disclosure |
| B-13 | 900 | 103 | 0.000 | 1 | 5 | 6 | 1783 | 33.5 | Steel of Disclosure |
| B-14 | 910 | 116 | 0.000 | 2 | 3 | 5 | 1890 | 31.0 | Steel of Disclosure |
| B-15 | 920 | 84 | 0.000 | 2 | 5 | 7 | 1789 | 32.5 | Steel of Disclosure |
| B-16 | 930 | 86 | 0.000 | 1 | 5 | 6 | 1759 | 33.3 | Steel of Disclosure |
| B-17 | 950 | 111 | 0.000 | 2 | 5 | 7 | 1852 | 31.1 | Steel of Disclosure |
| B-18 | 930 | 93 | 0.000 | 4 | 5 | 9 | 1753 | 31.1 | Comparative Steel |
| B-19 | 1050 | 75 | 0.000 | 3 | 5 | 8 | 1781 | 31.2 | Comparative Steel |
| B-20 | 820 | 124 | 0.000 | 3 | 5 | 8 | 1773 | 31.0 | Comparative Steel |
| B-21 | 960 | 100 | 0.050 | 2 | 5 | 7 | 1853 | 30.1 | Comparative Steel |
| B-22 | 955 | 123 | 0.000 | 1 | 4 | 5 | 1853 | 30.1 | Steel of Disclosure |
| B-23 | 960 | 119 | 0.000 | 1 | 5 | 6 | 1853 | 30.1 | Steel of Disclosure |
| B-24 | 950 | 104 | 0.000 | 1 | 4 | 5 | 1853 | 30.1 | Steel of Disclosure |
| B-25 | 950 | 111 | 0.000 | 1 | 4 | 5 | 1853 | 30.1 | Steel of Disclosure |
| B-26 | 960 | 117 | 0.000 | 1 | 4 | 5 | 1853 | 30.1 | Steel of Disclosure |
| B-27 | 940 | 120 | 0.000 | 1 | 5 | 6 | 1853 | 30.1 | Steel of Disclosure |
| B-28 | 960 | 121 | 0.000 | 1 | 5 | 6 | 1853 | 30.1 | Steel of Disclosure |
| B-29 | 960 | 103 | 0.000 | 1 | 5 | 6 | 1853 | 30.1 | Steel of Disclosure |

The invention claimed is:

1. Steel for springs, the steel comprising a chemical composition containing
   C: 0.45 mass % or more and less than 0.65 mass %,
   Si: 0.15 mass % or more and 0.70 mass % or less,
   Mn: 0.10 mass % or more and 1.00 mass % or less,
   Cr: 0.20 mass % or more and 1.50 mass % or less,
   P: 0.025 mass % or less,
   S: 0.025 mass % or less,
   O: 0.0015 mass % or less,
   Sb: 0.010 mass % or more and less than 0.030 mass %,
   Sn: 0.010 mass % or more and 0.030 mass % or less, and
   the balance being Fe and incidental impurities, and an A value calculated by Formula (1) being 0.65 or more and 3.50 or less, a B value calculated by Formula (2) being 3.10 or more and 34.00 or less, and a C value calculated by Formula (3) being 0.020 mass % or more and 0.050 mass % or less:

$$A=[C]/([Si]+[Sb]+[Sn]) \quad (1),$$

$$B=[Si]/([Sn]+[Sb]) \quad (2),$$

$$C=[Sb]+[Sn] \quad (3),$$

where brackets represent content in mass % of an element enclosed in the brackets.

2. The steel for springs according to claim 1, wherein the chemical composition further contains one or more selected from the group consisting of
   Al: 0.50 mass % or less,
   Cu: 1.0 mass % or less,
   Ni: 2.0 mass % or less,
   W: 2.0 mass % or less,
   Nb: 0.1 mass % or less,
   Ti: 0.2 mass % or less,
   V: 0.5 mass % or less,
   Mo: 1.0 mass % or less, and
   B: 0.005 mass % or less.

3. A method for producing a spring, the method comprising:
   subjecting a steel semi-finished product with the chemical composition as recited in claim 1 to hot rolling to be finished into a steel bar or a wire rod; and
   hot forming the steel bar or the wire rod into a spring shape.

4. The method for producing a spring according to claim 3, wherein a D value calculated by Formula (4) is 125 or less, the D value being related to heating temperature T (° C.) during the hot forming and to Sb content [Sb] (mass %) and Sn content [Sn] (mass %) in the steel semi-finished product:

$$D=6883.66\times[Sb]-5213.09\times[Sn]+0.65\times T-543.76 \quad (4).$$

5. A method for producing a spring, the method comprising:
   subjecting a steel semi-finished product with the chemical composition as recited in claim 2 to hot rolling to be finished into a steel bar or a wire rod; and
   hot forming the steel bar or the wire rod into a spring-like shape.

6. The method for producing a spring according to claim 5, wherein a D value calculated by Formula (4) is 125 or less, the D value being related to heating temperature T (° C.) during the hot forming and to Sb content [Sb] (mass %) and Sn content [Sn] (mass %) in the steel semi-finished product:

$$D=6883.66\times[Sb]-5213.09\times[Sn]+0.65\times T-543.76 \quad (4).$$

* * * * *